April 15, 1941.  C. W. NESSELL  2,238,433
TEMPERATURE CONTROL SYSTEM
Filed Dec. 21, 1936
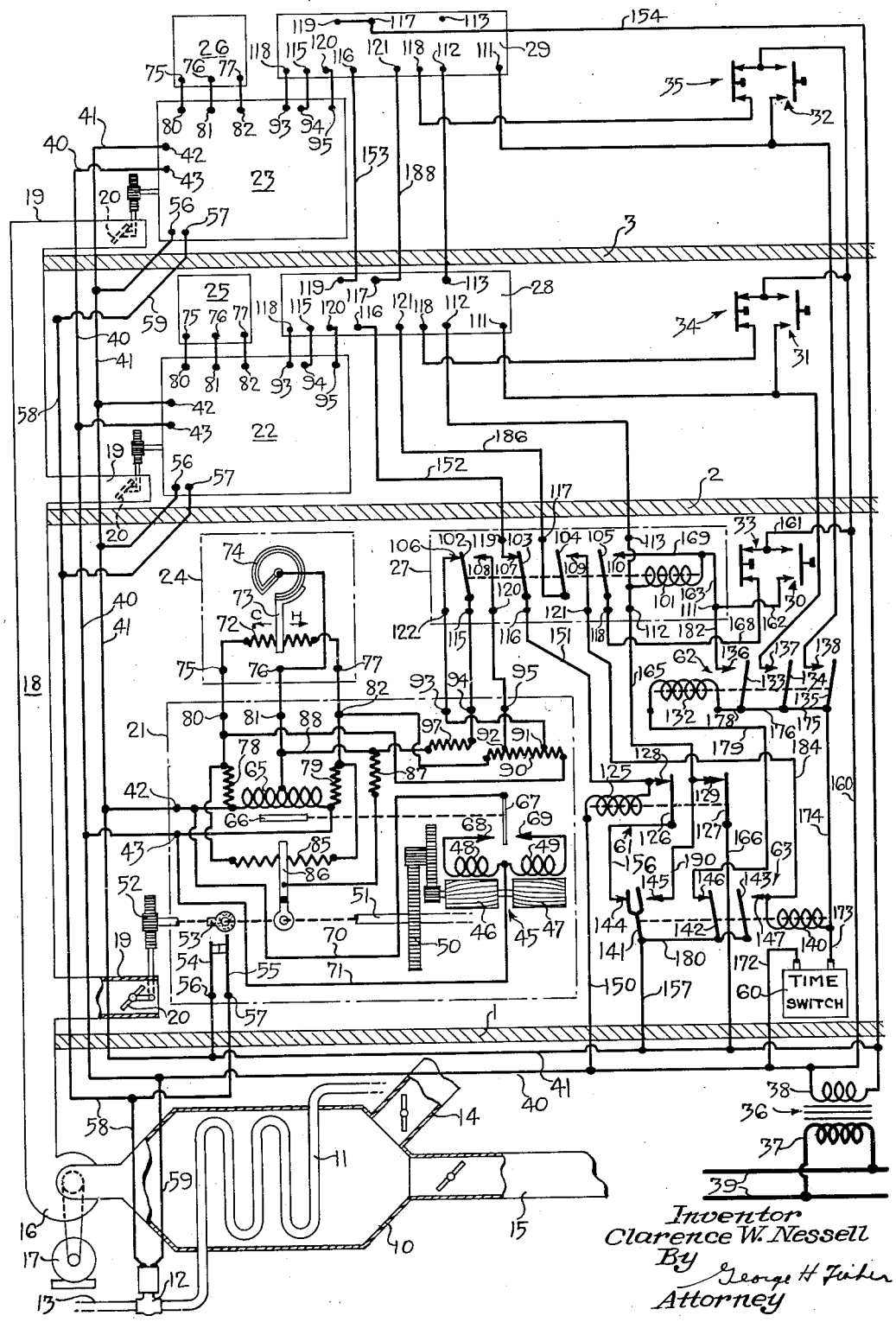
Inventor
Clarence W. Nessell
By George H. Fisher
Attorney Patented Apr. 15, 1941

2,238,433

UNITED STATES PATENT OFFICE 2,238,433

TEMPERATURE CONTROL SYSTEM

Clarence W. Nessell, Dayton, Ohio, assignor to Minneapolis-Honeywell Regulator Company, Minneapolis, Minn., a corporation of Delaware Application December 21, 1936, Serial No. 116,886

13 Claims. (Cl. 236—46)

My invention relates to a temperature control system and more particularly to that type known as a dual control system.

In certain types of heating systems where a number of different rooms or other compartments are to be heated, it is customary to provide a temperature responsive device in each of the rooms or compartments, which temperature device in turn controls a temperature changing device in the room. In such systems, it has been proposed to simultaneously vary the temperature maintained in all of the rooms by a simultaneous adjustment of all of the temperature responsive devices. A particular use for such an arrangement is where it is desired to lower the temperature at night. In such cases, some master control located at a convenient control point, such as a basement, is employed to lower the control point of all of the temperature responsive devices at night and in the morning to again raise the control point of these devices.

In the type of control system just mentioned, it is desirable to have some means in the individual rooms for individually adjusting the thermostatic device independently of the master control. Thus where the master control has called for the night temperature to be maintained, an occupant of one of the rooms may quite likely desire to have the day temperature maintained for at least a short time. The present invention is concerned with a system of the type described wherein an electrically operated means is associated with each of the temperature responsive devices, which electrically operated means is capable of individually adjusting the temperature responsive device with which it is associated.

An object of the present invention is accordingly to provide a temperature control system employing a plurality of temperature changing means, a control device for each temperature changing means, means for adjusting each of the control devices, master control means for operating all of the adjusting means in unison to change the temperature maintained by each temperature changing device, and electrically operated means associated with each adjusting means for operating any one of the adjusting means independently of the master controller.

A further object of the invention is to provide a temperature control system of the type of the previous object wherein all of the adjusting means are restored to the control of the master control means upon operation of the latter.

A further object of the present invention is to provide a condition control system employing a number of condition changing devices, each of which is regulated by a condition responsive control means, in which means including a relay is employed with each condition control means for changing the control point thereof, a master control device is employed for simultaneously energizing and deenergizing all of the relays, and switching means is associated with each relay for energizing and deenergizing the same independently of the master control device.

Further objects of this invention will become apparent from a consideration of the accompanying specification, claims and drawing.

In the drawing, my improved temperature control system is shown in a schematic form. The heating system is indicated as being of an indirect radiation type although it should be understood that the invention is not limited to any particular type of heating system.

Referring specifically to the drawing, a conditioning chamber is indicated by the reference numeral 10. Located within the conditioning chamber is a steam heating coil 11. This coil is supplied with steam from a supply pipe 13 leading to any suitable source of steam (not shown) and the flow of steam from supply pipe 13 to coil 11 is controlled by an electrically operated valve 12. Leading into the conditioning chamber 10 are a fresh air duct 14 and a return air duct 15. Both of these ducts are provided with damper means to regulate the proportional amounts of fresh air and return air entering the conditioning chamber. A fan 16 is employed to circulate the air through the various rooms. This fan is driven by a motor 17 of any suitable form. The air is forced by the fan 16 through the supply duct 18 which is provided with outlets 19 opening into the individual rooms, the floors of which are indicated by the numerals 1, 2 and 3. Located in each outlet 19 is a damper 20 which serves to control the amount of heated air entering the room. It will be readily seen that the outlet duct constitutes a temperature changing device for the room in which it enters and the damper 20 a regulating means for this temperature changing device.

Included in the control equipment for each room is a motor assembly, a thermostat and a relay. The motor assemblies are indicated by the reference numerals 21, 22 and 23. The thermostats for these motor assemblies are indicated by the reference numerals 24, 25 and 26, respectively. The relays associated with the previously mentioned equipment are referred to by the reference numerals 27, 28 and 29, respectively.

Also included with the control equipment for each room are a day push button and a night push button. The day push buttons are respectively indicated by the reference numerals 30, 31 and 32 and the night push buttons by the reference numerals 33, 34 and 35. Also included in the control equipment in general is a time switch 60 and three relays 61, 62 and 63. While various equipment has been referred to as associated with each room, it is to be understood that at least the relays 27, 28 and 29 can be located in the basement or some other point where they are out of the way. They have been shown in the drawing as located in the various rooms merely for aiding in the understanding of the operation of the system.

A step-down transformer 36 is employed to supply power for the operation of the control system. This transformer comprises a line voltage primary 37 and a low voltage secondary 38. The primary 37 is connected to line wires 39 leading to a suitable source of power (not shown). The secondary 38 is connected to conductors 40 and 41 which extend upwardly adjacent each of the rooms and serve to feed power for the operation of the various motor assemblies. Each of the motor assemblies 21, 22 and 23 is provided with terminals 42 and 43 which are connected to line wires 41 and 40, respectively.

The thermostat and motor assemblies act to variably position the damper 20 in accordance with the temperature in the individual rooms so as to maintain this temperature substantially constant. The control system is provided with means for compensating the same to change the temperature during certain portions of the day. The individual control systems so far as the portion previously described in this paragraph is concerned are substantially the same as that shown in the application of John E. Haines, Serial No. 109,857, filed November 9, 1936. While the operation of the system will be briefly described, reference is made to the above application for a more thorough understanding of this portion of the apparatus.

Located within the motor assembly 21 and serving to move the damper 20 is a motor 45. This motor may be of any suitable reversible type and is shown for convenience as a motor employing two rotors 46 and 47 and associated field windings 48 and 49. When field winding 48 is energized, the motor is rotated in one direction and when field winding 49 is energized, the motor is rotated in the opposite direction. The motor drives, through any suitable reduction gear train 50, a shaft 51. The shaft 51 is connected through a rack and pinion 52 to the damper 20.

Also secured to shaft 51 is a switch actuating arm 53, preferably of insulating material. This arm 53 is adapted to cooperate with a switch consisting of switch blades 54 and 55, which blades are biased into contact making engagement with each other. Arm 53 is adapted to engage the longer of the two blades 55 upon the damper 20 being moved to closed position and thus move blade 55 out of contact making engagement with blade 54. Blades 54 and 55 are connected to terminals 56 and 57. Terminal 56 is connected to conductor 41 which, as previously stated, leads to one side of the secondary of the transformer while terminal 57 is connected through a conductor 58 to one terminal of the electrically operated valve 12. The other terminal of the electrically operated valve is connected through conductor 59 to the conductor 40 which, as previously stated, leads to the other side of the secondary 38. It will readily be seen that the valve 12 is energized whenever the switch blades 54 and 55 are closed. As previously indicated, these blades are closed except when the damper 20 is in its completely closed position. Each of the motor assemblies 22 and 23, which are identical in structure to assembly 21, are similarly provided with the switching arrangement just described and the terminals 56 and 57 of these assemblies are similarly connected so as to control the energization of the valve 12, in parallel with the switch of assembly 21. Thus, so long as the damper in any room is at least partly open, valve 12 will be energized and held in its open position to supply steam to coil 11. Upon all of the dampers, however, being moved to closed position as a result of the absence of a call for heat in any of the rooms, valve 12 is closed to shut off the supply of steam to the coil 11.

A relay coil 65 is connected across the power supply by being connected to terminals 42 and 43. Associated with the relay coil 65 is an armature 66 which is, in turn, connected to a relay arm 67. The relay arm 67 is adapted to be moved by armature 66 into engagement with either of two contacts 68 and 69. The switch blade 67 is electrically connected through conductor 70 with one supply terminal 42 and the junction of windings 48 and 49 is connected through conductor 71 with the other supply terminal 43. It will thus be seen that when relay coil 65 is so energized as to effect engagement of switch arm 67 with contact 68, field winding 48 will be energized while when the relay winding 65 is so energized that the switch blade is moved into engagement with contact 69, field winding 49 is energized. The motor is so designed and so connected to shaft 51 that when field winding 48 is energized the motor rotates in a direction to move the dampers towards closed position and when field winding 49 is energized the motor rotates shaft 51 in a direction to effect opening of damper 20.

The thermostat 24 comprises a resistance 72 and a contact arm 73 slidable thereover. The resistance 72 and contact arm 73 constitute the control potentiometer for the motor assembly. Operatively connected to the contact arm 73 is a bimetallic element 74 or any other suitable temperature responsive device capable of imparting movements to an object upon changes in temperature. The thermostat 24 is provided with terminals 75, 76 and 77. The opposite ends of resistance 72 are connected to terminals 75 and 77 while the contact arm 73 is connected through bimetallic element 74 to the terminal 76. Located within the motor assembly are protective resistances 78 and 79. The motor assembly is provided with thermostat terminals 80, 81 and 82. The protective resistances 78 and 79 are connected between the opposite ends of relay coil 65 and terminals 80 and 82. Terminal 81 is connected to the mid point of relay coil 65. Contacts 75, 76 and 77 of the thermostat 24 are connected to the thermostatic contacts 80, 81 and 82, respectively, of the motor assembly. It will be readily seen that the control potentiometer is connected to the relay coil 65 in parallel with the source of power in such a manner that the position of the contact arm 73 controls the relative energization of the two halves of relay winding 65.

Also located within the motor assembly 21 is a rebalancing potentiometer comprising the resistance 85 and a contact arm 86 which is secured to and rotatable with shaft 51. The opposite ends of resistance 85 are connected to the relay coil 65, through the resistances 78 and 79. The contact arm 86 is connected through a desensitizing resistance 87 to conductor 88 which, in turn, is connected to the mid point of relay coil 65. It will thus be seen that the rebalancing potentiometer constituted by resistance 85 and contact arm 86 is connected in parallel with the control potentiometer to the relay 65. It will further be noted that any movement of the contact arm of either potentiometer relative to its associated resistance affects the relative energization of the two halves of relay coil 65 and if the energization of the relay coil is previously balanced, results in this energization being unbalanced.

The bimetallic element 74 is so arranged that any increase in temperature causes the arm 73 to be deflected to the right as indicated in the drawing by the arrow designated by the letter H. Similarly, any decrease in temperature causes contact arm to move in the opposite direction as indicated by the arrow designated C. Thus, if it is assumed that the temperature in the room decreases, the contact arm 73 will be deflected to the left. This deflection of contact arm to the left results in the voltage applied to the left half of relay coil 65 being decreased and that applied to the right-hand side being increased, thus unbalancing the energization of the relay coil and causing armature 66 to move towards the right. The movement of armature 66 to the right causes switch arm 67 to engage with contact 69 and thus result in the energization of field winding 49 of motor 45. As previously explained, the energization of this field winding causes the shaft 51 to rotate in a direction to effect movement of the damper 20 towards open position. This movement of shaft 51 is in a clockwise direction.

Inasmuch as the contact arm 86 of the rebalancing potentiometer is rigidly secured to shaft 51, the movement of shaft 51 in a clockwise direction results in the movement of contact arm 86 to the right. The movement of contact arm 86 to the right tends to increase the energization of the left-hand side of relay coil 65 and decrease the energization of the right-hand side of relay coil 65. It will be noted that the effect of this movement of contact arm 86 is opposite to that of the movement of contact arm 73 of the control potentiometer which initiated the movement of the motor so that if this movement of contact arm 86 is continued sufficiently long, the energization of relay 65 will again be rebalanced. The movement of shaft 51 will continue until relay 65 is again so rebalanced at which time contact arm 67 will be moved out of engagement with contact 69 and the motor will be deenergized.

By reason of the fact that desensitizing resistance 87 is inserted in the connection between the contact arm 86 of the rebalancing potentiometer and the mid point of relay coil 65 and such a resistance is not included in the connection between the contact arm 73 and the mid point of the relay coil, the action of the rebalancing potentiometer will be less sensitive. As a result, for any movement of contact arm 73 of the control potentiometer, it is necessary for there to be a much greater movement of the contact arm of the rebalancing potentiometer before the system is rebalanced. In other words, the damper 20 is moved from full open to full closed position as a result of the movement of contact arm 73 over considerably less than the full range of its movement. The importance of this feature will be referred to later.

Also located within the motor assembly 21 is a resistance 90 of a compensating potentiometer. The resistance 90 is provided with taps 91 and 92 which are connected to terminals 93 and 95. The opposite ends of resistance 90 are connected to the opposite ends of resistances 72 and 85 of the control and rebalancing potentiometers. Terminal 94 of the assembly 21 is connected through a desensitizing resistance 97 with the conductor 88 leading to the mid point of relay coil 65. Terminals 93, 94 and 95 are adapted to be connected to the relay 27 and when so connected, the relay is operative when deenergized to connect terminals 93 and 94 and when energized to connect terminals 94 and 95. Since terminal 94 is connected to the center of the relay coil 65, it will be obvious that the action of the relay 27 is to connect the mid point of the relay coil 65 with either tap 91 or 92.

When the mid point of coil 65 is connected to tap 91, because of the relay being deenergized, a further potentiometer is in effect, introduced into the system, which potentiometer is tapped at a point considerably to the right of its center. The result is that in order for the system to be balanced, it is necessary for the contact arm 73 of the control potentiometer to assume a position considerably to the left of mid position, which position corresponds to a lower temperature. The position assumed will be one in which the supply of heat furnished to the room by reason of the position of damper 20 will be just sufficient to maintain the room at a temperature corresponding to one to the left of the center of resistance 72.

Upon energization of relay 27 with the resultant connection of terminals 94 and 95, the center of relay coil 65 is connected to the tap 92 of resistance 90. As soon as this takes place, the system is immediately unbalanced by reason of the fact that the center wire is no longer connected to a point to the right of the mid point of resistance 90 but is connected to a point on the left side of the center of resistance 90. In order for the system to again be rebalanced, it is necessary for the contact arm 73 to assume a position considerably to the right of the center of resistance 72. In the new position of contact arm 73, an increased amount of heat will be supplied to the room which increased amount will be sufficient to maintain the temperature at a higher deired value. When the center of the relay coil 65 is connected to tap 91, which will be during night operation, the thermostat will control about a range to the left of the mid point of resistance 72 while when the center point is connected to tap 92 the thermostat will control about a range to the right of the center of resistance 72. Due to the presence of desensitizing resistance 87, the thermostat, even though controlling over limited temperature ranges, can cause movement of the damper over substantially its entire range of movement. By reason of the presence of the desensitizing resistance 97 in the connection between the center of relay coil 65 and the taps 91 or 92, the effect of the compensating resistance is reduced. This is necessary in order to prevent the shift of the control point of thermostat 24 from being too great.

For a more complete understanding of this method of shifting the temperature maintained, reference is made to the above mentioned application of John E. Haines.

The relay 27 comprises a relay coil 101 which is designed to actuate a sereis of relay arms 102, 103, 104 and 105. Relay arms 102 and 103 are adapted to engage with contacts 106 and 107, respectively, when in the deenergized position of the relay. Relay arms 102, 104 and 105 are adapted to engage with contacts 108, 109 and 110 upon energization of the relay coil 101. It is to be understood that the various relay arms are biased to their deenergized positions so that upon deenergization of the relay, these arms move immediately to their deenergized position which is the position in which they are shown in the drawing. Relay coil 101 is connected at one end to terminal 111 and at the other end is connected to terminals 112 and 113, which terminals are electrically connected together. The relay arms 102, 103, 104 and 105 are connected to terminals 115, 116, 117 and 118, respectively. Contacts 106, 107, 108 and 109 are connected to terminals 122, 119, 120 and 121. The contact 110 is connected to terminal 111.

While the internal structure of only motor assembly 21, thermostat 24 and relay 27 have been described, it is to be understood that the corresponding devices in the other control units are identical. These devices have accordingly not been shown in detail in the drawing and have been shown merely in outline. The various terminals of these other control devices have the same reference numerals applied to them as were applied in connection with the description of devices 21, 24 and 27.

The relay 61 comprises a relay coil 125 which is designed to cooperate with relay arms 126 and 127. These relay arms are adapted upon energization of the relay to be moved into engagement with contacts 128 and 129, respectively. The relay arms are biased out of engagement with their respective contacts.

Relay 62 comprises a relay coil 132 and relay arms 133, 134 and 135. The relay arms 133, 134 and 135 are adapted to be moved upon energization of the relay coil into engagement with contacts 136, 137 and 138, respectively. When the relay coil is deenergized, the contact arms are held out of engagement with their respective contacts by suitable biasing means.

The relay 63 comprises a relay coil 140. Cooperating with the relay coil 140 are relay arms 141, 142 and 143. Relay arm 141 is adapted to cooperate with either of two contacts 144 and 145, being biased into engagement with contact 144 and being moved into engagement with contact 145 upon energization of the relay coil 140. Contact arm 141 is of the overlapping type so that upon energization of the relay coil it engages contact 145 before it separates from contact 144. Relay arm 142 is adapted to engage a contact 146 when the relay is deenergized while relay arm 143 is adapted to engage a contact 147 upon energization of the relay.

Operation

The various elements are all shown in the position they occupy during the night. As previously explained, the normal condition is that the relays 27, 28 and 29 are energized during the day and deenergized at night, the deenergization being effected by the opening of time switch 60. During the day, relay 61 is deenergized. As soon as the relays 27, 28 and 29 are deenergized, relay 61 is energized through the following circuit: from one terminal of secondary 38 through conductor 49, conductor 150, relay coil 125, conductor 151, terminal 116 of relay 27, relay arm 103, contact 107, terminal 119 of relay 27, conductor 152, terminal 116 of relay 28 to terminal 119 of the same relay, conductor 153, terminal 116 of relay 29 to terminals 119 and 117 of the same relay, and through conductor 154 to the other terminal of secondary 38. The circuit just traced includes the paths from terminals 116 to 119 of the several relays. It is to be understood that these terminals are connected together when the relays are deenergized, in the same manner as terminals 116 to 119 of relay 27 are connected by the engagement of contact 107 and relay arm 103 when relay 101 is deenergized. Similarly, whenever two terminals of relay 27 are shown as connected by reason of either an energized or deenergized position of relay coil 101, the corresponding terminals of the other relays are also connected if these relays are similarly energized.

The energizing circuit traced in the preceding paragraph results in the initial energization of relay coil 125. This causes relay arms 126 and 127 to be moved into engagement with contacts 128 and 129, respectively, as shown in the drawing. The moving of the relay arm 126 into engagement with contact 128 results in the following holding circuit for relay coil 125 being established: from secondary 38 through conductor 49, conductor 150, relay coil 125, contact 128, relay arm 126, conductor 156, contact 144, relay arm 141 and conductors 157 and 41 to the other terminal of secondary 38. It will be noted that the new circuit is independent of relays 27, 28 and 29 so that if any of these relays are subsequently energized, relay coil 125 will still remain energized.

As previously stated, the various elements are shown in the position which they occupy at night. In this position, the various relays 27, 28 and 29 are deenergized so that in each case the terminals 93 and 94 of the motor assembly are connected through the engagement of relay arm 102 with contact 106. As previously explained, when these terminals are so connected, a lower temperature is maintained in the room. If it is desired under these conditions to restore a higher temperature to any one of the rooms, the day push button for that particular room is actuated. Let it be assumed that it is desired to restore day temperature in the room located between the floors designated by the reference numerals 1 and 2. The actuation of day push button 30 causes the following circuit to be established to relay coil 101: from one terminal of secondary 38 through conductors 160 and 161, day push button switch 30, conductors 162 and 163, relay coil 101, terminal 112, conductor 165, contact 129, relay arm 127 and conductors 166 and 41 to the other terminal of secondary 38.

The energization of relay coil 101 as a result of the establishment of the previously traced circuit causes contact arms 102, 104 and 105 to move into engagement with contacts 108, 109 and 110, respectively. The moving into engagement of relay arm 105 with contact 110 establishes the following holding circuit to relay coil 101: from one terminal of secondary 38 through conductors 160 and 161, the night push button switch 33, conductor 168, terminal 118, relay arm 105, contact 110, conductor 169, relay coil 101, terminal 112, conductor 165, contact 129, relay arm 127 and conductors 166 and 41 to the other terminal of secondary 38. It will be noted that the holding circuit for relay coil 101 just traced is independent of the push button switch 30 and is dependent upon the push button 33 remaining in its normally closed position.

The moving into engagement of relay arm 102 with contact 108 results in terminal 94 of the motor assembly being connected to terminal 95 which, as previously explained, causes a higher day temperature to be maintained. While the movement of relay arm 103 out of engagement with contact 107 results in the interruption of the previously established energizing circuit for relay coil 125 of relay 61, this relay coil is not deenergized because of the prior establishment of the previously traced holding circuit for the same. The relay 27 will thus continue to remain energized, maintaining a higher temperature in the one room independently of that maintained in the others and independently of time switch 60. Whenever it is desired to deenergize the relay 27 and restore the room in question to night control, all that is necessary to do is to momentarily push the push button 33. Since the holding circuit for relay coil 101 is dependent upon the closure of push button 33, the opening of this push button will result in the deenergization of relay coil 101 causing all of the relay arms to move to their deenergized position. Upon push button 33 being released, the holding circuit to relay coil 101 will not be re-established because of the intervening separation of relay arm 105 from contact 110.

As soon as the time switch 60 closes its contacts, which will take place at a desired time in the morning, the following circuit is established to relay coil 132 of relay 62: from one side of the secondary 38 through conductors 40 and 172, time switch 60, conductors 173, 174, 175, 176, and 178, relay coil 132, conductor 179, contact 146, contact arm 142 and conductors 180, 157 and 41 to the other side of secondary 38.

The energization of relay coil 132 as the result of the establishment of this circuit causes relay arms 133, 134 and 135 to move into engagement with contacts 136, 137 and 138, respectively. The moving into engagement of relay arm 133 with contact 136 will result in the establishment of the following energizing circuit for relay coil 101: from one terminal of secondary 38 through conductors 40 and 172, time switch 60, conductors 173, 174, 175, and 176, relay arm 133, contact 136, conductor 182, terminal 111, conductor 163, relay coil 101, terminal 112, conductor 165, contact 129, relay arm 127 and conductors 166 and 41 to the other terminal of secondary 38.

Contact 137 is connected to terminal 111 of relay 28 in the same manner as contact 136 is connected to terminal 111 of relay 27. Similarly, contact 138 is connected to terminal 111 of relay 29. Contacts 112 and 113 and all of the relays 27, 28 and 29 are connected in series and to conductor 165. It will thus be readily seen that engagement of relay arms 134 and 135 with contacts 137 and 138 causes relays 28 and 29 to be energized in the same manner as the engagement of relay arm 133 with contact 136 results in the energization of relay 27. Thus, the energization of relay coil 132 results in the simultaneous energization of relays 27, 28 and 29 through a circuit including the relay arms and contacts of relay 62 and the contact 129 and relay arm 127 of relay 61. Inasmuch as it is assured that relay 61 is in its energized condition by reason of the establishment of its holding circuit, there is an assurance that all of the relays 27, 28 and 29 will be energized upon closure of the time switch.

It will be noted that the above described energizing circuits for the relay coils of the relays 27, 28 and 29 are independent of the various push buttons in the rooms. While it is highly desirable to insure that these relays are initially energized independently of these push buttons, it is also desirable that the control of the relays be transferred back to the push buttons so that the temperature in the various rooms can be regulated independently of the time switch if desired. Thus, as soon as the relays 27, 28 and 29 are pulled in, an energizing circuit is established for relay coil 140 as follows: from one terminal of secondary 38 through conductors 40 and 172, time switch 60, conductor 173, relay coil 140, conductor 184, terminal 121 of relay 27, contact 109, relay arm 104, terminal 117 of relay 27, conductor 186, terminals 121 and 117 of relay 28, conductor 188, terminals 121 and 117 of relay 29 and conductor 154 to the other terminal of secondary 38.

The establishment of the previously traced circuit results in the energization of relay coil 140. The energization of this relay coil causes contact arms 142 and 141 to move out of engagement with contacts 146 and 144 and also causes contact arms 141 and 143 to move into engagement with contacts 145 and 147, respectively. The engagement of relay arm 143 with contact 147 results in the establishment of the following holding circuit for relay coil 140: from one terminal of secondary 38 through conductors 40 and 172, time switch 60, conductor 173, relay coil 140, contact 147, relay arm 143, conductors 180, 157 and 41 to the other terminal of secondary 38.

The moving of switch arm 142 out of engagement with contact 146 results in the energizing circuit for relay coil 132 being interrupted so that this relay is again deenergized. The result of the deenergization of this relay coil is that all of the previously traced energizing circuits for relays 27, 28 and 29 are interrupted. Momentarily, however, and before contact arm 141 definitely separates from contact 144, each of these relays 27, 28 and 29 is maintained energized by the holding circuit through contact arm 105 and contact 110 and through contact 129 and contact arm 127, which holding circuit was traced previously in connection with the description of the operation upon actuation of the day push button during the night cycle. As soon as relay arm 141 leaves contact 144, however, the holding circuit just traced is interrupted. Before this holding circuit is interrupted, however, contact arm 141 has engaged contact 145. The result is that a new holding circuit is established for each of the relay coils 27, 28 and 29. The new holding circuit for relay coil 101 of relay 27 is as follows: from one terminal of secondary 38 through conductors 40, 160 and 161, night push button 33, conductor 168, terminal 118, relay arm 105, contact 110, conductor 169, relay coil 101, terminal 112, conductors 165 and 190, contact 145, relay arm 141 and conductors 157 and 41 to the other terminal of secondary 38.

It is believed unnecessary to trace the new holding circuits for each of the other relay coils. In each case the circuit is from conductor 160 through the night push button of the room to terminal 113 through the relay coil to terminal 112 and since all of the terminals 112, 113 are connected in series to conductor 165, as previously stated, from terminal 112 to the other terminal of the secondary.

It will be noted that during the previously described operation following the closure of the time switch 60, relay 62 was energized and then deenergized. A function of this relay is to insure that all of the relays 27, 28 and 29 are initially pulled in regardless of their previous condition. As soon as all of these relays have pulled in, as indicated by the energization of relay 63 whose initial energizing circuit is dependent upon the closure of all the relays 27, 28 and 29, relay 62 is deenergized restoring the control of the individual relays 27, 28 and 29 to the day and night push buttons in the several rooms. It is thus assured that all of the relays are automatically placed under control of the time switch when the same closes, regardless of their positions at the time of closure of the time switch.

It will be noted that the individual energizing circuits for the relay coils of relays 27, 28 and 29 were broken upon the deenergization of relay 62. Moreover, the only holding circuits for these relays are through the respective night push buttons. Consequently, if in any room, it is desired to go to night temperature during the day cycle, all that is necessary is to push the respective night push button. Thus if it is desired to maintain a lower night temperature in the room in which relay 27 is located, actuation of push button 33 will open the holding circuit for relay 27 resulting in the continued deenergization of the same even after release of the push button because of the fact that this deenergization results in the separation of relay arm 105 and contact 110. The subsequent closure of the night push button upon release thereof does not re-establish the energization of relay coil 101. If, however, at a later time of the day it is again desired to re-establish the day temperature in the room, all that is necessary to do is to push the day push button 30. The effect of pushing this button will be exactly the same as that previously outlined in connection with the actuation of the same during the night. The only difference will be that the energizing circuit for relay coil 101 established as a result of actuation of the day push button 30 will be from conductor 165 through conductor 190 and contact 145, contact arm 141 and conductor 157 instead of through contact 129, contact arm 127 and conductor 166. In other words, during the night the energizing circuits for relay coil of the relays 27, 28 and 29 are dependent upon the closure of relay 61 whereas in the day the energizing circuits for these relay coils are dependent upon the closure of relay 63.

Since all of the possible energizing and holding circuits for relays 27, 28 and 29 during the day are dependent upon the energization of relay 63, and the energization of this relay, in turn, depends upon the closure of time switch 60, it will be obvious that the opening of this time switch at the end of the day cycle results in the deenergization of all of the relays. Thus, it is assured that regardless of their position when the time switch cycles, all of the relays 27, 28 and 29 are deenergized, thus resulting in the various controls being shifted to their night setting.

As soon as the time switch does open at the end of the day cycle and the various relays are deenergized, the relay coil 125 will be again energized through the same energizing circuit as traced in the first portion of the operation of the system. This, in turn, will again result in the establishment of the holding circuit for relay coil 125 and the apparatus will be in the condition previously described for the night cycle.

It will be readily seen that by means of my control system, it is possible entirely by electrical means to go from night to day setting and back in any one room regardless of the setting of the master control, which in the illustrative embodiment is the time switch. Moreover, regardless of the settings of the control devices in the various rooms, they are all placed under the control of the master control at the time that this master control again cycles.

It is to be understood that while a certain type of individual temperature control system for each room has been described, my system in general is applicable to various types of temperature control systems. Thus, instead of the compensated control system shown wherein the dampers are variably positioned, it would be possible to have an on and off control system with means for compensating the individual thermostats. Moreover, it would be entirely possible to employ a day and night thermostat for each room with the relay switch 102 functioning to transfer the damper motor from the control of the day to the night thermostat and vice versa. Of course, it is obvious also that the control system is not limited to an indirect radiation type of heating system but is applicable to any case where there are a number of temperature changing devices with individual regulation of each device.

In general, while I have shown a certain specific embodiment of my invention it is to be understood that this is for purposes of illustration and that my invention is to be limited only by the scope of the appended claims.

I claim as my invention:

1. In a condition control system, a plurality of condition changing means, an electrically operated regulating device for each of said condition changing means, a single condition responsive control device for each of said regulating devices, circuit connections between each of said control devices and its associated regulating device and effective to permit said control device to cause said regulating device to maintain the controlled condition at a substantially constant value, means including a two position relay switch for each control device for altering said circuit connections between the control device and the regulating device to cause either of two values of said condition to be maintained, a relay coil associated with each relay switch and effective when energized to move said relay switch from a first position towards which it is biased to a second position, master control means including a time switch for periodically energizing and deenergizing all of said relay coils, and means including switching means associated with each relay coil for energizing said relay coil upon momentary actuation thereof from a first position to a second position independently of said master control means and of the other relay coils.

2. In a condition control system, a plurality of condition changing means, an electrically operated regulating device for each of said condition changing means, a single condition responsive control device for each of said regulating devices, circuit connections between each of said control devices and its associaited regulating device and effective to permit said control device to cause said regulating device to maintain the controlled condition at a substantially constant value, means including a two position relay switch for each control device for altering said circuit connections between the control device and the regulating device to cause either of two values of said condition to be maintained, a relay coil associated with each relay switch and effective when energized to move said relay switch from a first position towards which it is biased to a second position, master control means including a time switch for periodically energizing and deenergizing all of said relay coils, and switching means associated with each relay coil for deenergizing said relay coil upon momentary actuation thereof from a first position to a second position independently of said master control means and of the other relay coils.

3. In a condition control system, a plurality of condition changing means, an electrically operated regulating device for each of said condition changing means, a single condition responsive control device for each of said regulating devices, circuit connections between each of said control devices and its associated regulating device and effective to permit said control device to cause said regulating device to maintain the controlled condition at a substantially constant value, means including a two position relay switch for each control device for altering said circuit connections between the control device and the regulating device to cause either of two values of said condition to be maintained, a relay coil associated with each relay switch and effective when energized to move said relay switch from a first position towards which it is biased to a second position, master control means including a time switch for periodically energizing and deenergizing all of said relay coils, and means including switching means associated with each relay coil for energizing said relay coil when deenergized by said master control means and deenergizing the same when energized by said master control means in response to momentary actuation thereof from a first position to a second position independently of said master control means and of the other relay coils.

4. In a condition control system, a plurality of condition changing means, an electrically operated regulating device for each of said condition changing means, a single condition responsive control device for each of said regulating devices, circuit connections between each of said control devices and its associated regulating device and effective to permit said control device to cause said regulating device to maintain the controlled condition at a substantially constant value, means including a two position relay switch for each control device for altering said circuit connections between the control device and the regulating device to cause either of two values of said condition to be maintained, a relay coil associated with each relay switch and effective when energized to move said relay switch from a first position towards which it is biased to a second position, means including a switch associated with each relay coil for energizing said relay coil independently of the other relay coils, and master control means including a time switch operative to periodically energize and deenergize all of said relay coils independently of the condition in which they have been placed as the result of the actuation of the switches associated with the individual coils.

5. In a condition control system, a plurality of condition changing means, an electrically operated regulating device for each of said condition changing means, a single condition responsive control device for each of said regulating devices, circuit connections between each of said control devices and its associated regulating device and effective to permit said control device to cause said regulating device to maintain the controlled condition at a substantially constant value, means including a two position relay switch for each control device for altering said circuit connections between the control device and the regulating device to cause either of two values of said condition to be maintained, a relay coil associated with each relay switch and effective when energized to move said relay switch from a first position towards which it is biased to a second position, means including a switch associated with each relay coil for deenergizing said relay coil independently of the other relay coils, and master control means including a time switch operative to periodically energize and deenergize all of said relay coils independently of the condition in which they have been placed as the result of the actuation of the switches associated with the individual coils.

6. In a condition control system, a plurality of condition changing means, an electrically operated regulating device for each of said condition changing means, a single condition responsive control device for each of said regulating devices, circuit connections between each of said control devices and its associated regulating device and effective to permit said control device to cause said regulating device to maintain the controlled condition at a substantially constant value, means including a two position relay switch for each control device for altering said circuit connections between the control device and the regulating device to cause either of two values of said condition to be maintained, a relay coil associated with each relay switch and effective when energized to move said relay switch from a first position towards which it is biased to a second position, master control means including a time switch for periodically energizing and deenergizing all of said relay coils, and means associated with each condition responsive control means for actuating the associated relay switch independently of the other relay switches and of the master control means.

7. In a condition changing system for a plurality of zones, condition changing means for each zone, condition responsive means in each zone, circuit connections between each condition responsive means and the associated condition changing means for varying the condition changing effect of the condition changing means by an amount which is in proportion to the departure of the condition in the respective zone from a predetermined value, means for altering said circuit connections to adjust said predetermined value so that different values of the condition will be maintained within the respective zones depending upon the circuit connections, timing means for periodically and simultaneously altering the circuit connections between the condition responsive means and the associated condition changing means to periodically vary the value of the condition being maintained in the various zones for predetermined lengths of time, and manual means for altering any of the circuit connections whereby the temperature in any selected zone at any time may be changed to the value normally maintained in the zone at a different time.

8. In a condition changing system for a plurality of zones, condition changing means for each zone, condition responsive means in each zone, circuit connections between each condition responsive means and the associated condition changing means for varying the condition changing effect of the condition changing means by an amount which is in proportion to the departure of the condition in the respective zone from a predetermined value, means for altering said circuit connections to adjust said predetermined value so that different values of the condition will be maintained within the respective zones depending upon the circuit connections, timing means for periodically and simultaneously altering the circuit connections between the condition responsive means and the associated condition changing means to periodically vary the value of the condition being maintained in the various zones for predetermined lengths of time, manual means for altering any of the circuit connections whereby any of the condition responsive means may be caused to maintain one said predetermined condition at a time when it would normally be set to maintain the other predetermined condition, and means for automatically restoring control of the timing means over all of the condition responsive means at the beginning of each timing period.

9. In a system of the class described for controlling the condition of a plurality of spaces, condition changing means including a condition regulating device for each of the various spaces, condition responsive means for each of said spaces, means operated by the condition responsive means for varying the position of said regulating device by an amount which is proportional to the departure in the value of the condition from a normal value, timing means for automatically changing the normal value of the condition to be maintained in each of the spaces at predetermined times during the day so that the conditions of the spaces will be maintained at different values during different portions of the day, and means for causing the condition responsive means in any one space to maintain during one portion of the day the condition at the value that is normally maintained during the other portion of the day, and means for causing all of the condition responsive means to return to normal control at the beginning of each timing period.

10. In a condition changing system for a plurality of zones, condition changing means for each zone, condition responsive means in each zone for controlling the condition changing means to maintain predetermined conditions in each zone, timing means periodically movable to a circuit making and a circuit breaking position, means under the control of the timing means for causing each of the condition responsive means to maintain one predetermined condition as long as the timing means is in circuit making position and to cause the condition responsive means to maintain a second predetermined condition as long as the timing means is in circuit breaking position, manual means for selectively causing any of the condition responsive means to maintain one said predetermined condition at a time when it would normally be set to maintain the other predetermined condition, and means independent of operation of the manual means for insuring normal control of the timing means over the various condition responsive means after the timing means has moved to its other circuit controlling position.

11. In a condition control system, a plurality of condition changing means, an electrically operated regulating device for each of said condition changing means, a condition responsive control means for each of said regulating devices, circuit connections between each of said control means and its associated regulating device and effective to permit said control means to cause said regulating device to maintain the controlled condition at a substantially constant value, means including a two position relay switch for each control means for altering said circuit connections between the control means and the regulating device to cause either of two values of said condition to be maintained, a relay coil associated with each relay switch and effective when energized to move said relay switch from a first position towards which it is biased to a second position, master control means including a time switch for periodically energizing and deenergizing all of said relay coils, said time switch having a circuit making position and a circuit breaking position, circuit connections for causing all of said relay coils to be energized by said time switch only so long as the time switch is in circuit making position and to cause all of the relay coils to be deenergized by said time switch as long as the time switch is in circuit breaking position, and manually operated means associated with each relay coil for controlling the energization thereof in response to momentary closure thereof independently of the master control means.

12. In a condition control system, a plurality of condition changing means, an electrically operated regulating device for each of said condition changing means, a condition responsive control means for each of said regulating devices, circuit connections between each of said control means and its associated regulating device and effective to permit said control means to cause said regulating device to maintain the controlled condition at a substantially constant value, means including a two position relay switch for each control means for altering said circuit connections between the control means and the regulating device to cause either of two values of said condition to be maintained, a relay coil associated with each relay switch and effective when energized to move said relay switch from a first position towards which it is biased to a second position, master control means including a time switch for periodically energizing and deenergizing all of said relay coils, means for controlling the energization of said relay coils, said means including second, third and fourth relay means and a timing means periodically movable to circuit making and breaking positions, means for normally energizing said second relay means when the timing means is in circuit breaking position, means responsive to movement of the timing means to circuit making position for energizing the third relay means, means responsive to energization of the third relay means for energizing said relay coils, means responsive to energization of said relay coils for energizing said fourth relay means, means responsive to energization of said fourth relay means for deenergizing said second and third relay means, means including said timing means for maintaining said fourth relay means energized, a maintaining circuit for said relay coils including switch means controlled by said fourth relay means, a first manual switch means associated with each relay switch for selectively opening the maintaining circuit for any of said relay coils, and second manual switch means associated with each relay switch, and means responsive to momentary closure of any of said second manual switch means for causing the energization of the associated relay coil, said means including the fourth relay when the timing means is in circuit making position and including the second relay when the timing means is in circuit breaking position.

13. In a system of the class described for controlling the condition of a plurality of spaces, condition changing means for the various spaces, condition responsive means for each of said spaces, means controlled by each condition responsive means for varying the effect of the condition changing means for that space to maintain the condition at a predetermined value, motor means associated with each of said condition responsive means for adjusting the predetermined value of the condition maintained in the space, manual switch means associated with each of said motor means controlling the energization thereof, master control apparatus for all of said motor means, said master control apparatus comprising automatic cycling relay means and a time switch, means including said time switch and said cycling relay means for initiating the operating cycle thereof, means operated by said cycling relay means for establishing an energizing circuit for each of said motor means and then interrupting said energizing circuits, means operative upon energization of each of said motor means to establish a holding circuit therefor extending through its respective manual switch means, means including said manual switch means for deenergizing the associated motor means independently of the position of said time switch, all of said relays and motor means being deenergized in the event of power failure but said time switch operating to reinitiate the cycle of said cycling relays upon resumption of power to reenergize said motor means.

CLARENCE W. NESSELL.